Jan. 11, 1927.   L. N. AUGER   1,614,224
REFLECTOR
Filed May 21, 1925   3 Sheets-Sheet 1

– FIG-1 –

Inventor
LOUIS M. AUGER,
By
Attorney

Jan. 11, 1927. 1,614,224
L. N. AUGER
REFLECTOR
Filed May 21, 1925 3 Sheets-Sheet 2

—FIG-2—

Inventor
LOUIS M. AUGER,
By
Attorney

Jan. 11, 1927.

L. N. AUGER 1,614,224

REFLECTOR

Filed May 21, 1925   3 Sheets-Sheet 3

Inventor
LOUIS M. AUGER,
By
Attorney

Patented Jan. 11, 1927.

1,614,224

UNITED STATES PATENT OFFICE.

LOUIS N. AUGER, OF LOS ANGELES, CALIFORNIA.

REFLECTOR.

Application filed May 21, 1925. Serial No. 31,946.

My invention has reference, in its broad aspect, to improvements in reflectors wherein multiple reflecting zones having relatively different focal lengths are utilized to effect improved distribution of light to the end that greater concentration will be obtained in a band-like area of high intensity and uniform distribution of light provided in surrounding areas of modified intensity, thus especially adapting my reflector for use as a flood light, a vehicle head light, or for any other purpose where it is essential that something more than high, uncontrolled or unmodified and dazzling brilliancy be attained. More particularly it is my purpose to provide a parabolic reflector having a central reflecting zone, and a plurality of segmental parabolic reflecting zones occupying the balance of the reflecting field and each having a greater focal length than that contemplated by the central reflecting zone. By these means a band-like area of high intensity is attained, the illuminating value of which is gradually increased to a central point of greater brilliancy, and this area of high intensity is surrounded by a uniform area of modified intensity. In constructing my reflector I develop my central reflecting zone from a given parabolic segment of less focal length than any of the segmental zones, and my remaining zones from segments of a given parabola more shallow or of greater focal length than the parabola contemplated by a cross section of the reflector. Furthermore, my reflector may be utilized for heat projection as well as for light projection by the simple substitution of a resistance element for the usual illuminating bulb, and the use of a coppered instead of a highly polished nickeled surface. According to my inventive concept the reflector may be revolved about the source of light or heat so that when used as a heat reflector or projector the band-like area of high intensity may be directed vertically, horizontally or otherwise thereby especially adapting my reflector for general household use, for medicinal purposes as in heat therapy, and the like.

Other and equally important advantages of my reflector may be briefly defined as follows; first, effective illumination is obtained without resorting to ribbed surfaces, wedge shaped corrugations, and other unusual contours inducing difficult and complicated manufacturing problems; second, so-called high rays are eliminated thereby avoiding dazzling the eyes of a person approaching the light when my reflector is used as an element of a vehicle head light; third, my reflector may be struck from an ordinary die or post thereby rendering its production economical; fourth, by the simple expedient of slightly modifying the curve values of the reflecting zones or areas many different types of illumination may be attained thereby adapting my reflector to a variety of uses without materially changing its form.

The structural elements employed to accomplish the above and other results and objects will be hereinafter more fully described in detail and pointed out in the claims appended hereunto and forming a part of this specification; but the scope of my invention may only be determined by the limits defined in the claims.

In the accompanying drawings, wherein is illustrated the preferred embodiment of my invention;—

Like characters of reference refer to like or similar parts throughout the several views of the drawings, in which;—

Figure 1:
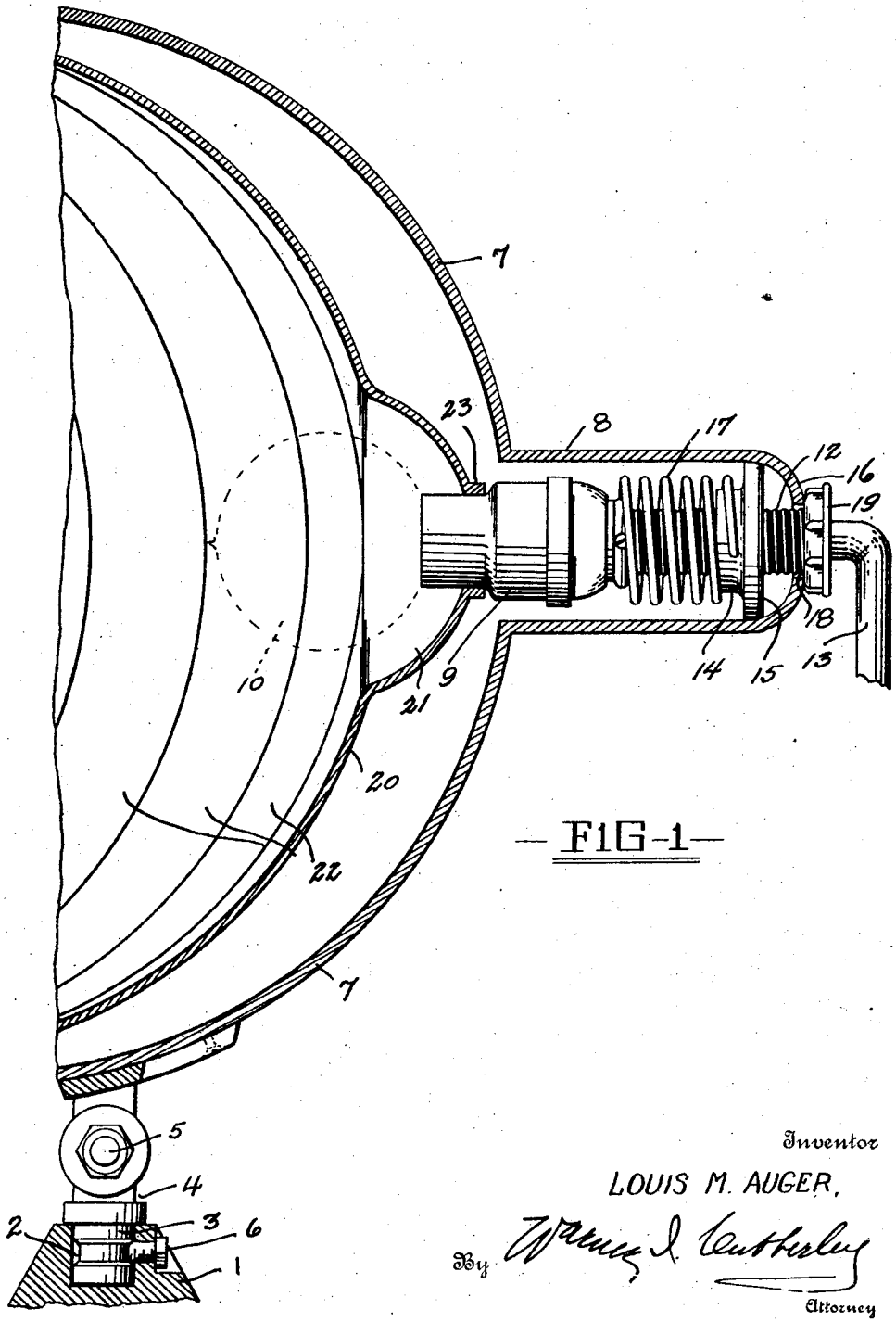
Figure 1 is a vertical section of an improved form of illuminating device embodying my reflector.

The numeral (1) designates a suitable base which is recessed as at (2) to receive the annularly grooved end (3) of a sectional supporting device or post (4), the sections of which are pivoted together by a bolt (5) so that my illuminating (or heating) device may be swung vertically. A locking pin or bolt (6) carried by the base (1) extends into the groove of the support (4) for the purpose of adjusting the illuminating device on a horizontal axis.

My illuminating (or heating) device includes a housing (7) formed with a central, cylindrical, hollow extension (8) in which is carried the supporting and coupling elements of my socket (9). The socket (9) which may receive either an illuminating bulb (10)—shown in dotted lines in Figure 1—or a resistance element (11), is fixed on a screw threaded hollow shank (12) through which electrical connections (13) extend. Mounted on the shank (12) is a collar (14) provided with an annular flange (15) for frictional engagement with the end wall (16) of the extension (8) and the position of the collar on the shank will determine the position of the socket (9) in the housing (7). A spring (17) is arranged between the flange of the collar and the socket. The free end of the shank (12) extends through an opening (8) in the end of the extension and has mounted thereon a locking nut (19) which is adapted to be moved to engage the end wall (16) for holding the socket assembly rigidly in position in the housing.

Figure 4:
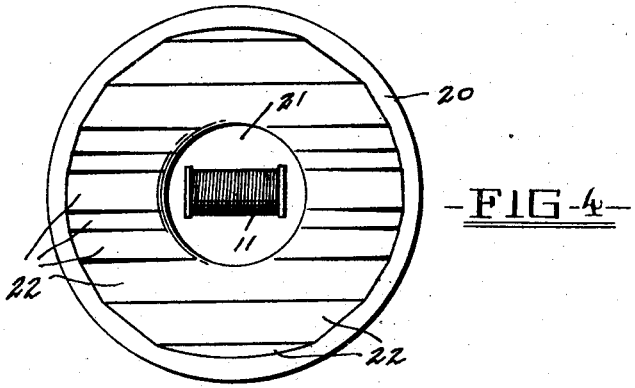
Figure 4 is a front elevation of my reflector as used in heat projection.

Mounted within the housing is my parabolic reflector (20), which same is formed with a central reflecting zone (21), and a plurality of contiguous reflecting zones (22) of greater focal length than the central zone. Centrally of the zone (21) is an opening surrounded by a flange (23) and this flange is adapted to frictionally engage the socket (9) so that the reflector, although supported securely on the socket, may be either rotated about the socket to assume different positions from the normal position here shown in which the zones (22) extend vertically or the shank (12) itself may be rotated by loosening the member (14) and nut (19) to accomplish a like purpose. For instance in Figure 4 the zones (22) are shown as extending horizontally which is oftentimes expedient when my reflector is used for heat projection with the resistance element (11) substituted for the illuminating bulb (10). However for the heating assembly the reflector should preferably have a coppered surface instead of a polished nickeled surface.

Figure 2:
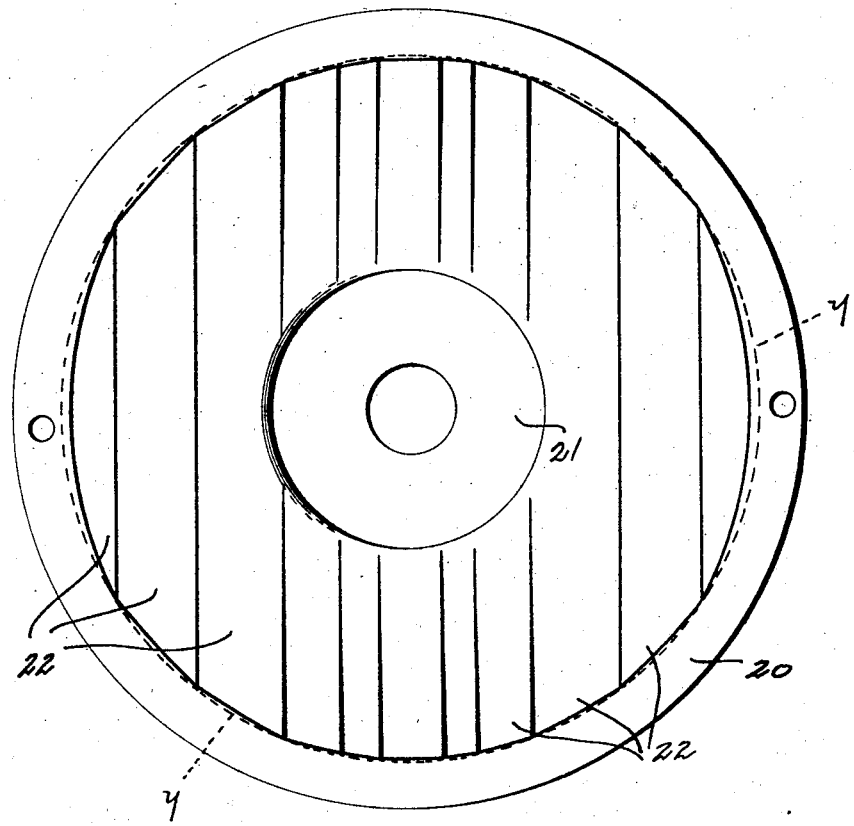
Figure 2 is a front elevation of my reflector.
Figure 3:
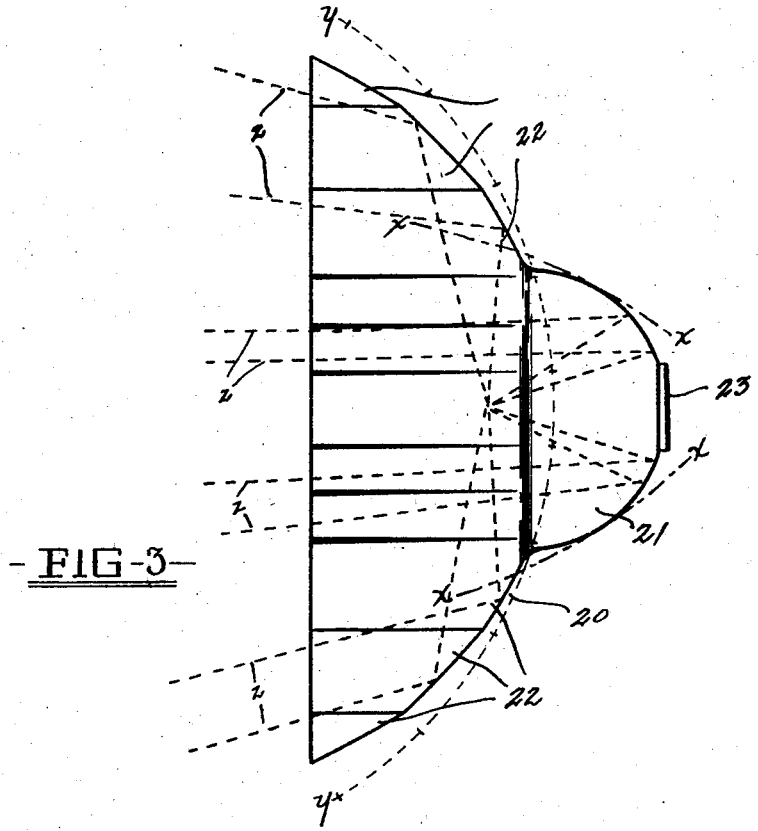
Figure 3 is a diagrammatic view through the horizontal axis of my reflector.

Referring now to Figures 2 and 3 it will be seen that the zone (21) has a curvature of less focal length or greater depth than that contemplated by a cross section of the reflector and shown by dotted lines x—x in Figure 3, whereas the zones (22) have a curvature of greater focal or more shallow, or of less lineal curvature length than the parabola contemplated by a cross section of the reflector, they being formed of segments of a parabola having a focal length approximating that shown in dotted lines y—y in Figures 2 and 3. It will be apparent then, that the light (or heat) rays emanating from the focal point substantially midway the depth of the reflector will assume a direction suggested by dotted lines z, which when applied to head lights for motor vehicles, for instance, will project rays in a band-like area in advance of the vehicle with the highest intensity slightly above the road bed, but not high enough to dazzle the eyes of the driver of another vehicle approaching the light, and that on either side of the band of high intensity will be a uniform area of modified intensity designed to minimize the effect of non-receptiveness produced upon a driver's eyes through concentration on the high intensity area. When applied to a flood light, the object thus illuminated will be caused to stand out with a pleasing glow more effective than the high, marked brilliancy induced, for instance, by a spot-light having a symmetrical cylindrical reflecting surface. In heat therapy, the band of high intensity can be adjusted to affect the desired part of the patient's body, while the low or modified intensity area produces a desirable and beneficial warmth surrounding the patient. In heat projection for ordinary household use, as in a cold dressing room, the band of high intensity can be adjusted to completely envelop a person's body, while the modified intensity area permits of considerable moving about without leaving the properly heated portion of the room. In fact, my present reflector has many uses which it is neither necessary nor desirable to specify in detail since they are manifest to anyone skilled in the art to which my invention applies.

While in the foregoing, there has been illustrated and described such combination and arrangement of elements as constitute the preferred embodiments of my invention, it is nevertheless desired to emphasize the fact that interpretation of my invention should only be conclusive when made in the light of the subjoined claims Having described my invention and its objects with such attention to detail as will thoroughly acquaint one skilled in the art with its construction and advantages, I claim:—

1. A reflector of the type described and formed to define in cross section through its vertical and horizontal planes a given parabola, comprising a plurality of reflecting zones developed from segments of a parabola having a focal length greater than the parabola defined by a cross section of the reflector taken on its horizontal plane, and a single reflecting zone having a focal length less than those defined by any of the segmental zones.

2. A reflector of the type described and formed to define on any of its longitudinal cross sections a given parabola comprising a plurality of segmental reflecting zones developed from segments of a parabola having a focal length greater than the parabola defined by a cross section of the reflector, and a single, centrally located reflecting zone developed from a parabola having a focal length less than by the parabola defined by a cross section of the reflector.

3. A reflector of the type described and formed to define on any of its longitudinal cross sections a given parabola comprising a plurality of contiguous segmental reflecting zones developed from parabolas having a focal length greater than the parabola defined by a cross section of the reflector, and a single, centrally located reflecting zone having a focal length less than the parabola contemplated by a cross section of the reflector.

4. A reflector of the type described and formed to define on any of its longitudinal cross sections a given parabola comprising a single reflecting zone located centrally of the reflector and having a focal length less than the parabola defined by a cross section of the reflector, and a plurality of contiguous segmental reflecting zones surrounding the central zone and having each a focal length greater than the parabola defined by a cross section of the reflector.

5. A reflector assembly comprising a housing formed with a hollow extension, a screw-threaded hollow shank carried in the extension, a collar adjustable on the shank and adapted to support the same by frictional engagement with the walls of the extension, a socket on the shank, electrical connections extending through the shank to the socket, and a reflector movably mounted on the socket and formed with a plurality of segmental zones the reflecting surfaces of which are adapted to project a band of heat or light having a greater length than width and a central area of high intensity, whereby adjustment of said reflector on the socket will vary the position of the projected band of heat or light from an element carried in the socket.

In testimony whereof, I affix my signature hereunto.

LOUIS N. AUGER.